Oct. 27, 1959  P. Q. R. SCHREIBER  2,910,103
MACHINE FOR CUTTING LEAF TOBACCO
Filed Nov. 9, 1954  7 Sheets-Sheet 1

Inventor
PATRICK QUINTIN ROBERT SCHREIBER,
By
Attorney

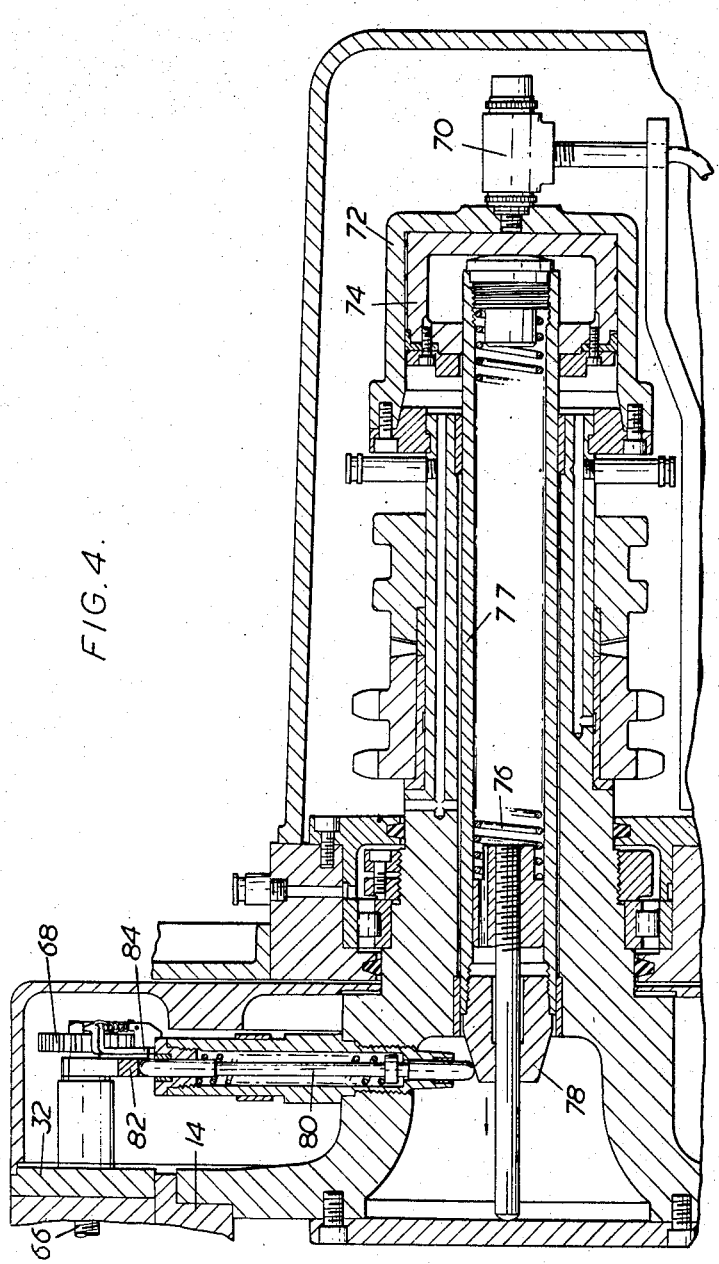

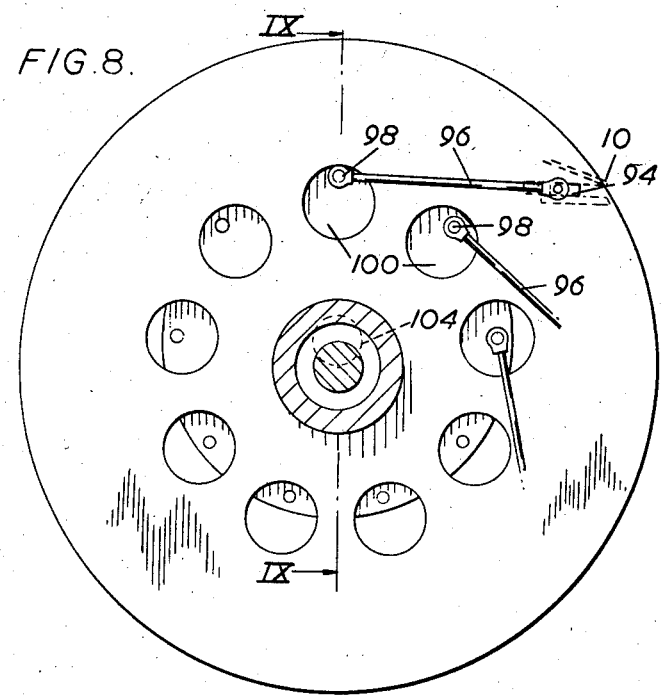
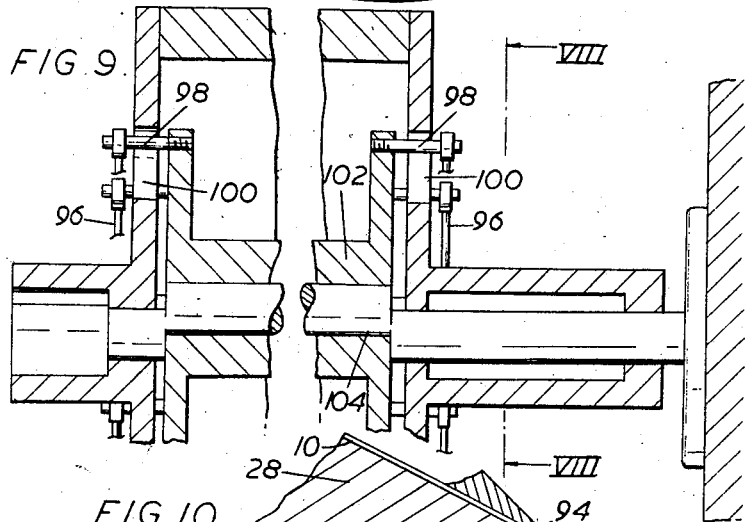

Inventor
PATRICK QUINTIN ROBERT SCHREIBER
By Robert B Pearson
Attorney

Oct. 27, 1959  P. Q. R. SCHREIBER  2,910,103
MACHINE FOR CUTTING LEAF TOBACCO
Filed Nov. 9, 1954  7 Sheets-Sheet 7
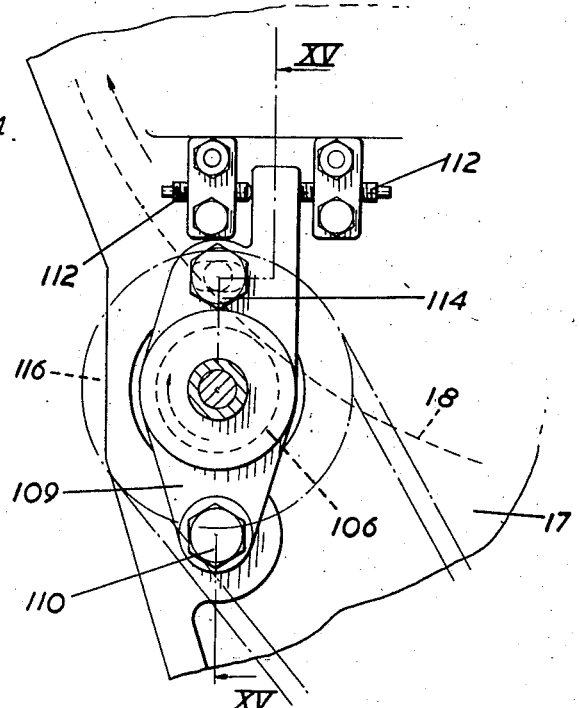
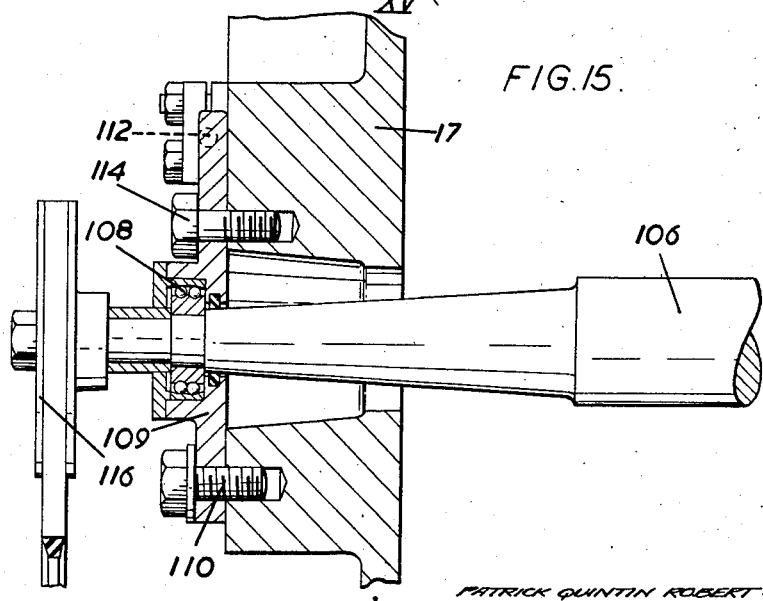
Inventor
PATRICK QUINTIN ROBERT SCHREIBER
By
Attorney

2,910,103
MACHINE FOR CUTTING LEAF TOBACCO

Patrick Quintin Robert Schreiber, London, England

Application November 9, 1954, Serial No. 467,846

Claims priority, application Great Britain November 10, 1953

5 Claims. (Cl. 146—119)

This invention concerns machines in which leaf tobacco is fed between conveyors to a mouthpiece, through which it passes to be cut into shreds by a rotary cutter carrying knives with cutting edges movable in a cylindrical surface which nearly touches the front face of the mouthpiece.

In such machines there may be a grinding mechanism mounted to traverse the length of the cutter.

The cutter may consist of a drum on which are a plurality of knife holders, each holder consisting of an inner block and an outer plate between which the knife is gripped.

The main object of the invention is to improve the construction and operation of the cutter, and subsidiary objects will appear from the following description.

According to a feature of this invention the outer plate is pivoted near its rear edge and has at least one inwardly directed portion which cooperates with a member movable in a direction substantially parallel to the axis of the cutter, the portion having wedge faces which engage further wedge faces on the member, so that movement of the member causes the outer plate to grip the knife.

According to a further feature of this invention each knife holder incorporates mechanism for feeding the knife between the block and plate, and the mechanisms of all the knife holders are connected by ratchet means to a pneumatic cylinder to which air is admitted under the control of a valve responsive to traversing movement of the grinding mechanism.

According to a further feature of this invention mechanism for feeding a knife includes means which upon conclusion of feeding movement of the knife stops the machine.

According to a further feature of this invention the cutter has pockets to receive cut tobacco from each knife, and each pocket has a bottom formed by a bar connected by links to pins which extend through holes in the ends of the cutter from a member which can turn on an eccentric stationary shaft within the cutter.

According to a further feature of this invention the knives are flat sheets of metal lying in planes which are slightly inclined to the axis of the cutter, and the knife holders are twisted slightly on the drum so that each knife projects from its knife holder to the same extent throughout its length.

Preferably the holders are fitted to flat facets of the drum and each facet has a slight taper.

According to a further feature of this invention a machine includes a serrated spindle mounted close to and parallel to the cylindrical surface between the mouthpiece and the grinding mechanism with means for rotating the spindle rapidly.

The accompanying drawings show an example of a preferred construction of machine embodying the features of this invention. In the drawings:

Figure 4 is an enlarged section on the line IV—IV in Figure 2;

Figure 8 is an end view of a drum to show ejector mechanism which may be added to the machine, but which for the sake of clarity is omitted from earlier figures. This view is on the line VIII—VIII in Figure 9;

Figure 9 is a section on the line IX—IX in Figure 8;

Figure 10 is a detail section of a knife holder;

Figure 11:
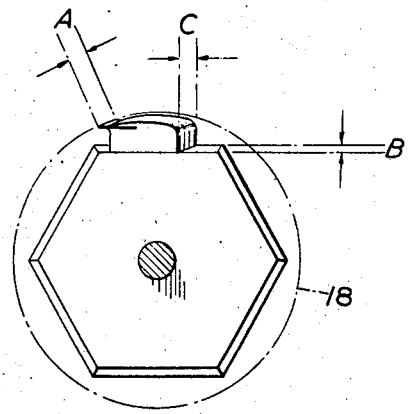
Figure 12:
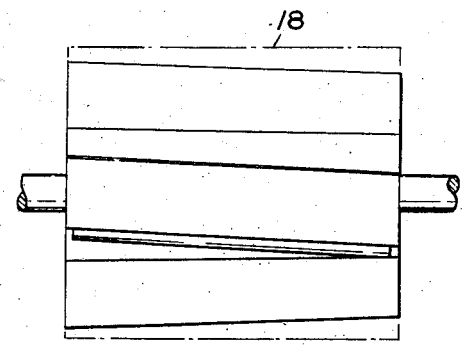
Figure 13:
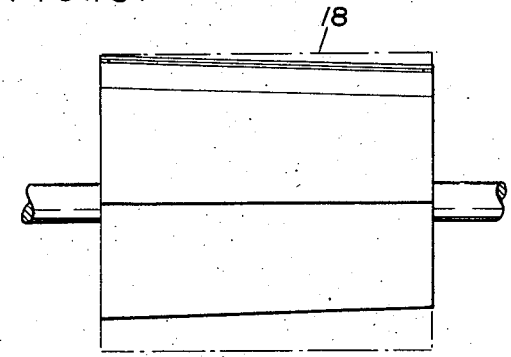

Figure 11 is a diagram showing in an exaggerated manner the slight inclination of the cutting edges of the knives to the axis of the cutter; Figure 12 is a top view of the diagram of Figure 11; Figure 13 is a front view of the diagram of Figure 11;

Figure 14 is an end view of a serrated spindle mounted close to and parallel to the cylindrical surface between the mouth piece and grinding mechanism; and Figure 15 is a section on the line XV—XV in Figure 14.

Leaf tobacco is fed into the space 2 between two converging conveyor belts 4 and 6 which carry the tobacco to a mouthpiece 8 and at the same time compress it so that it is driven through the mouthpiece as a plug. Details of the conveyor belts and mouthpiece are more fully described in application Serial No. 467,845, now Patent No. 2,874,739, issued February 24, 1959. As the plug emerges it is shredded by a cutter 9 consisting of knives 10 (see Figure 2) carried in holders 12 on a drum 14 which rotates about an axis 16 in bearings carried by arms 17. The cutting edges of the knives all lie on an imaginary cylindrical surface which is indicated at 18. The cut tobacco falls into a hopper 20 and is carried away.

The knives are in the form of thin plates of tool steel and are progressively fed outwards in their holders by mechanism to be described in detail later. At the same time the knives are sharpened by a grinding mechanism 22 which moves on a bed 24 parallel to the axis 16. In this way the diameter of the cylindrical surface 18 is kept constant. When so much of a knife has been worn and ground away that there is no longer sufficient for the holder to grip, then the machine is automatically stopped. An operator then resets the feed mechanism and inserts a fresh knife.

The drum 14 has nine flat facets 26, on each of which is fitted a knife holder 12. The holder consists of an inner block 28 and an outer plate 30, together with end pieces 32. The knife 10 lies between the block 28 and the plate 30 and its cutting edge 36 projects only very slightly. The cut tobacco gathers in a pocket 38 in a member 40 secured to the block 28, and then falls into the hopper.

Figure 7:
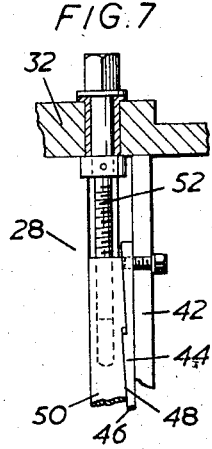
Figure 7 is a section on line VII—VII in Figure 3.

The plate 30 is pivoted on pins 34 projecting inwards from the end pieces 32, and has a limb 42 directed radially inwards. This limb carries a bar 44 with a series of wedge faces 46 (see Figure 7) which cooperate with wedge faces 48 on a bar 50 lying in a groove in the block. This bar 50 can be moved axially by a screw 52 so as to cause the plate 30 to grip the knife 10 over its whole length.

Figure 2:
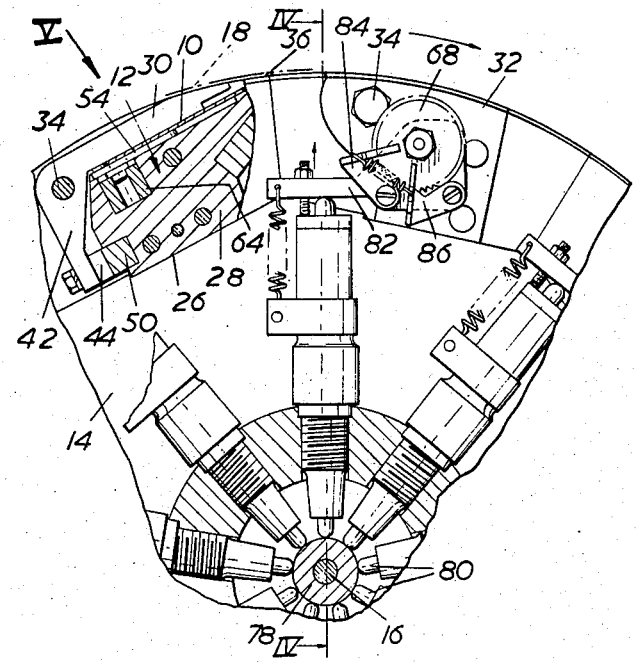
Figure 2 is an enlarged view of part of the end of the cutter visible in Figure 1.
Figure 5:
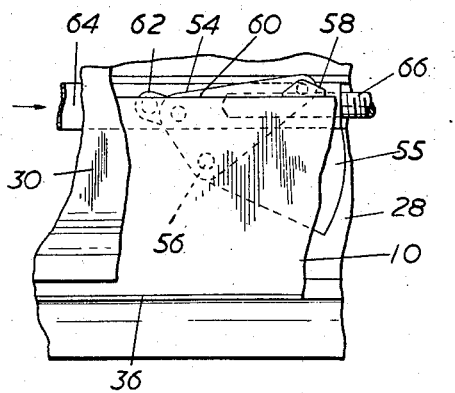
Figure 5 is an enlarged view of part of a knife holder seen in the direction of the arrow V in Figure 2, parts being broken away.
Figure 3:
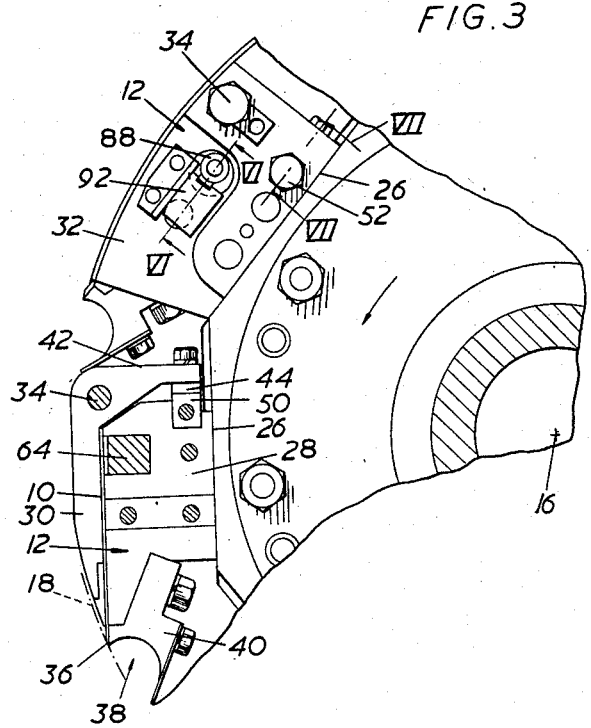
Figure 3 is a view of part of the opposite end of the cutter.

A number of bell-crank levers 54 (see Figure 5) are housed in recesses 55 in the block 28 and are pivoted at 56. Each lever carries a pivoted pusher 58 which bears against the rear edge 60 of the knife 10, and each lever is connected by a pivoted link 62 to a bar 64 lying in a groove in the block. This bar can be moved axially by a screw 66 carrying a ratchet wheel 68 (see Figure 2). Clockwise rotation of the wheel as seen in Figure 2 causes the bar to move to the right as seen in Figure 5, and thus swing the levers 54 and urge the knife evenly forward against the friction due to the grip exerted on the knife.

All the ratchet wheels 68 associated with the nine knives on the cutter are operated simultaneously by mechanism shown in Figure 4. Compressed air is admitted through a rotary gland 70 into a cylinder 72 at the end of the drum, so as to force a piston 74 axially against a spring 76. The piston bears on a tube 77 which carries a conical member 78 on its inner end. This conical member operates spring-loaded push rods 80 which in turn each operate a spring-loaded rocking lever 82 carrying pawls 84 and 86 engaging one of the ratchet wheels 68. The supply of compressed air is controlled by a valve 87 (see Figure 1) fixed beside the bed 24 and operated by a cam or cams 89 on the grinding mechanism 22 so that at the end of each stroke, or every alternate stroke, of the grinding mechanism, a pulse of air is admitted to the cylinder and thus all the knives are fed a small distance.

Figure 6:
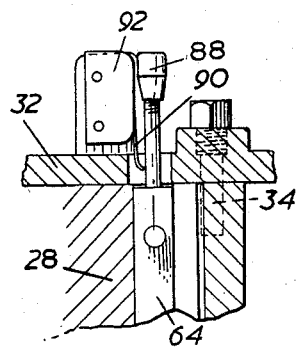
Figure 6 is a section on the line VI—VI in Figure 3.

The free end of each bar 64 carries a head 88 (see Figure 6) which cooperates with the operating arm 90 of an electric switch 92 which is connected to the driving control gear of the machine. When the bar approaches the limit of its travel, the head 88 opens the switch and the machine is automatically stopped.

If the machine is being used to cut tobacco to which sticky materials such as molasses have been added, the cut tobacco may not fall freely into the hopper, but tend to adhere to the wall of the pocket 38 below each knife.

In such circumstances, the member 40 secured to the block 28 is replaced by a member 40a as shown in Figure 10. This member defines a slot 93 in which is a bar 94 which acts as a movable bottom to the pocket 38a. Each bar extends beyond the ends of the member 40a and is controlled by links 96 pivoted to each end of the bar.

The links are connected to pins 98 which extend through holes 100 in the end walls of the drum and which are fixed in flanges of a sleeve 102 which can turn on an eccentric stationary shaft 104 within the drum. The sleeve is driven by contact of the pins with the edges of the holes 100, and the effect of the mechanism is that as each knife holder approaches its lowermost position the associated bar 40a is moved outwards in the slot 93 so as to eject positively the cut tobacco in the pocket 38a, and is then moved inwards again.

The mouthpiece 8 is rectangular with upper and lower edges parallel to the axis 16. In order to avoid a sudden jar as each knife cuts into the plug of tobacco, the cutting edges of the knives are slightly inclined to the axis of the cutter. This inclination amounts to one end of a knife 16 inches long being ⅛ inch in advance of the other end. This inclination is not apparent in Figures 1 to 10 but is illustrated by the exaggerated diagrams Figures 11 to 13 in which the number of facets of the drum is reduced and the inclination of the cutting edge increased.

As shown in Figure 11, the cutting edge of each knife not only lies in the cylindrical surface of revolution 18, but is inclined as indicated at A, i.e. one end of the cutting edge is in advance of the other so that the cutting edge enters the tobacco with less shock. The knives are flat, and the inclination A is obtained by tapering the facets of the drum as indicated at B, so that the planes of the knives are correspondingly inclined to the axis of the drum. In order that, despite this inclination, the knife shall project from its holder to substantially the same extent throughout its length, the knife holder is twisted in position on the drum as indicated at C.

Figure 1:
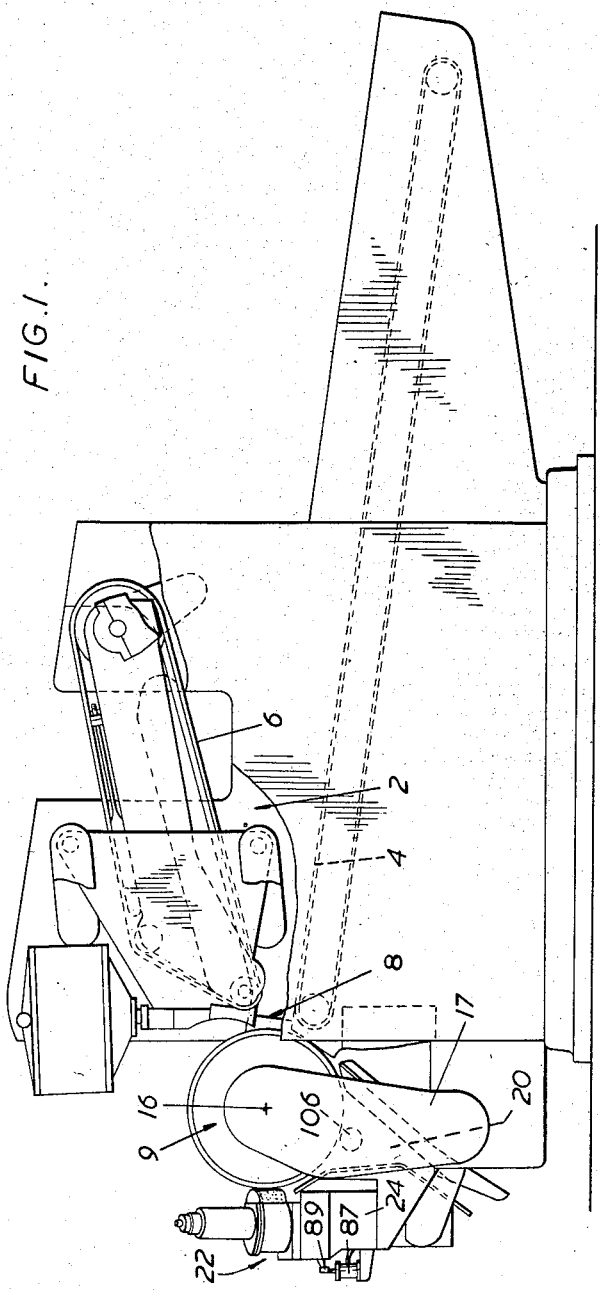
Figure 1 is a side elevation of the machine with parts broken away.

A serrated revolving spindle 106 (serrations not shown) as shown in Figures 1, 14 and 15, is mounted on the arms 17 close to and parallel to the cylindrical surface 18. The bearings 108 for the spindle are in brackets 109 which are pivoted at 110 and which can be adjusted by screws 112 and then clamped by bolts 114. The spindle is rotated rapidly by an independent electric motor (not shown) driving through a belt and a pulley 116. The direction of rotation of the spindle is the same as the direction of rotation of the cutter. The spindle serves to disturb the film of air which would otherwise be carried round with the cutter, and so ensures that cut tobacco becomes detached from each knife holder before it passes the grinding mechanism.

I claim:

1. A machine for cutting leaf tobacco into shreds, comprising a mouthpiece, conveyors for feeding tobacco through the mouthpiece, a rotary cutter, knives carried by said cutter and having cutting edges generating a cylindrical surface of revolution, the cutting edges of the rotating knives nearly touching the mouthpiece, the cutter comprising a drum having knife holders mounted thereon, each said knife holder comprising an inner block secured to said cutter and an outer plate, means pivoting the outer plate near the rear edge thereof whereby the outer plate is movable with respect to the inner block, the knife being carried between the inner block and outer plate, a member having a plurality of parallel wedge faces thereon carried by said cutter, means for moving said member in a direction substantially parallel to the axis of the cutter, a portion of the outer plate having wedge means thereon, the wedge faces of said member and the wedge means on said outer plate cooperating whereby movement of said member in one direction causes the outer plate to grip the knife.

2. A machine for cutting leaf tobacco into shreds, comprising a mouthpiece, a rotary cutter, knives carried by said rotary cutter, said knives having cutting edges generating a cylindrical surface of revolution, the cutting edges of the rotating knives nearly touching the mouthpiece, a grinding mechanism, means mounting the grinding mechanism to traverse the length of the cutter, knife holders mounted on said cutter, each knife holder comprising an inner block and an outer plate with the knife adapted to be gripped therebetween, means for feeding the knife between the block and plate, ratchet means associated with said feeding means, a pneumatic cylinder, means connecting said ratchet means with said pneumatic cylinder, and means responsive to traversing movement of the grinding mechanism for admitting air to said pneumatic cylinder to actuate the knife feeding means.

3. A machine for cutting leaf tobacco into shreds according to claim 2 and further including means for stopping the machine when the knife feeding means has reached the limit of movement thereof.

4. A machine for cutting leaf tobacco into shreds comprising, a mouthpiece, conveyors for feeding tobacco through the mouthpiece, a rotary cutter carrying knives, means for grinding cutting edges upon said knives, said grinding means being traversable parallel to the axis of rotation of said cutter, whereby said cutting edges generate a cylindrical surface of revolution nearly touching the mouthpiece, the cutter comprising a drum having tapered facets, knife holders and knives mounted on said tapered facets on the drum, the knives being flat sheets of metal lying in planes which are slightly inclined to the axis of the cutter, and the knife holders being angularly disposed on the drum facets so that each knife projects from the knife holder therefor to substantially the same extent throughout its length.

5. A machine according to claim 4 including mechanism for imparting a progressive feed to said knives whereby, during rotation of said cutter, said cutting edges are maintained in said cylindrical surface of revolution despite wear and grinding of said knives.

(References on following page)

References Cited in the file of this patent

UNITED STATES PATENTS

| | | |
|---|---|---|
| 2,224,948 | Bloomquist | Dec. 17, 1940 |
| 2,314,993 | Langrish | Mar. 30, 1943 |
| 2,399,529 | Willits | Apr. 30, 1946 |
| 2,614,596 | Schreiber | Oct. 21, 1952 |
| 2,634,062 | Forman | Apr. 7, 1953 |
| 2,681,065 | Worden | June 15, 1954 |
| 2,692,629 | Gardner | Oct. 26, 1954 |
| 2,735,469 | West | Feb. 21, 1956 |
| 2,747,634 | Klemm et al. | May 29, 1956 |

FOREIGN PATENTS

| | | |
|---|---|---|
| 665,652 | Great Britain | Jan. 30, 1952 |